(12) United States Patent
Brosch et al.

(10) Patent No.: US 11,361,446 B2
(45) Date of Patent: Jun. 14, 2022

(54) SEGMENTATION SYSTEM FOR SEGMENTING AN OBJECT IN AN IMAGE

(71) Applicant: KONINKLIJKE PHILIPS N.V., Eindhoven (NL)

(72) Inventors: Tom Brosch, Hamburg (DE); Jochen Peters, Norderstedt (DE); Rolf Juergen Weese, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 32 days.

(21) Appl. No.: 16/767,514

(22) PCT Filed: Nov. 26, 2018

(86) PCT No.: PCT/EP2018/082474
§ 371 (c)(1),
(2) Date: May 27, 2020

(87) PCT Pub. No.: WO2019/105869
PCT Pub. Date: Jun. 6, 2019

(65) Prior Publication Data
US 2020/0410691 A1 Dec. 31, 2020

(30) Foreign Application Priority Data

Dec. 1, 2017 (EP) .................................. 17204870

(51) Int. Cl.
*G06K 9/62* (2022.01)
*G06T 7/149* (2017.01)
(Continued)

(52) U.S. Cl.
CPC ........... *G06T 7/149* (2017.01); *G06N 3/0454* (2013.01); *G06N 3/08* (2013.01); *G06T 7/0012* (2013.01);
(Continued)

(58) Field of Classification Search
CPC ................... G06N 3/0454; G06N 3/08; G06T 2207/10081; G06T 2207/20081;
(Continued)

(56) References Cited

U.S. PATENT DOCUMENTS

| | | | |
|---|---|---|---|
| 9,668,699 B2 | 6/2017 | Georgescu et al. | |
| 2017/0109881 A1 | 4/2017 | Avendi et al. | |
| 2017/0213338 A1* | 7/2017 | Groth .................... | G06T 7/149 |

FOREIGN PATENT DOCUMENTS

WO 2016182551 A1 11/2016

OTHER PUBLICATIONS

Yanrong Guo, Deformable MR Prostate Segmentation via Deep Feature Learning and Sparse Patch Matching, Apr. 2016, IEEE.*
(Continued)

*Primary Examiner* — Xin Jia
(74) *Attorney, Agent, or Firm* — Micah-Shalom Kesselman

(57) ABSTRACT

The invention relates to a segmentation system for segmenting an object in an image. The segmentation system is configured to place a surface model comprising surface elements within the image, to determine for each surface element a respective sub volume (6) of the image and to use a neural network (51) for determining respective distances between the surface elements and the boundary of the object in the image based on the determined subvolumes. The surface model is then adapted in accordance with the determined distances, in order to segment the object. This segmentation, which is based on the subvolumes of the image and the neural network, is improved in comparison to known techniques which rely, (10) for instance, on a sampling of candidate points along lines being perpendicular to the
(Continued)

respective surface element and on a determination of likelihoods for the candidate points that they indicate a boundary of the object.

13 Claims, 9 Drawing Sheets

(51) Int. Cl.
  *G06N 3/04*   (2006.01)
  *G06N 3/08*   (2006.01)
  *G06T 7/00*   (2017.01)
(52) U.S. Cl.
  CPC .............. *G06T 2207/20081* (2013.01); *G06T 2207/20084* (2013.01); *G06T 2207/30016* (2013.01)
(58) Field of Classification Search
  CPC . G06T 2207/20084; G06T 2207/30016; G06T 7/0012; G06T 7/0014; G06T 7/10; G06T 7/12; G06T 7/149
  See application file for complete search history.

(56) References Cited

OTHER PUBLICATIONS

International Search Report and Written Opinion, International Application No. PCT/EP2018/082474, dated Jan. 10, 2019.
Ecabert, O. et al., "Segmentation of the heart and great vessels in CT images using a model-based adaptation framework", Medical Image Analysis, vol. 15, 2011.
Yang, H. et al., "Neural Multi-Atlas Label Fusion: Application to Cardiac MR Images", Cornell University Library, Sep. 2017.
Bai, W. et al., "Multi-atles segmentation with augmented features for cardiac MR images", vol. 19, No. 1, Jan. 2015.
Guo, Y. et al., "Deformable MR Prostate Segmentation via Deep Feature Learning and Sparse Patch Matching", Deep Learning for Medical Image Analysis, Jan. 2017.
Longwei, F. et al., "Brain Image Labeling Using Multi-atlas Guided 3D Fully Convolutional Networks", Conference Paper, Aug. 2017.
Peters, J. et al., "Optimizing boundary detection via Simulated Search with applications to multi-modal heart segmentation", Medical Image Analysis, 2010, pp. 70-84.
F. C. Ghesu et al. "Marginal Space Deep Learning: Efficient Architecture for Volumetric Image Parsing" IEEE TMI 2016, 35(5), 1217-1228.
Weese, J. et al., "Shape-Constrained Deformable Models and Applications in Medical Imaging", Shape Analysis in Medical Image Analysis, 2014.
R. Korez et al. "Model-Based Segmentation of Vertebral Bodies from MR Images with 3D CNNs" in MICCAI 2016, LNCS vol. 9901, pp. 433-441.
Vorontsov, E. et al., "Metastatic liver tumour segmentation with a neural network-guided 3D deformable model", Medical & Biological Engineering & Computing—Apr. 2016.
Korez, R. et al., "Intervertebral disc segmentation in MR images with 3D convolutional networks", https://www.spiedigitallibrary.org/conference-proceedings-of-spie/10133/1/Intervertebral-disc-segmentation-in-MR-images-with-3D-convolutional-networks/10.1117/12.2254069.short?SSO=1, Feb. 2017.

\* cited by examiner

SEGMENTATION SYSTEM FOR SEGMENTING AN OBJECT IN AN IMAGE

This application is the U.S. National Phase application under 35 U.S.C. § 371 of International Application No. PCT/EP2018/082474, filed on 26 Nov. 2018, which claims the benefit of European Application Serial No. 17204870.4, filed 1 Dec. 2017. These applications are hereby incorporated by reference herein.

FIELD OF THE INVENTION

The invention relates to a segmentation system, method and computer program for segmenting an object in an image. The invention further relates to a training system, method and computer program for training a neural network.

BACKGROUND OF THE INVENTION

The article "Segmentation of the heart and great vessels in CT images using a model-based adaptation framework" by O. Ecabert et al., Medical Image Analysis, volume 15, pages 863-876 (2011) discloses a model-based segmentation technique for segmenting a heart in an image. The model-based segmentation includes placing a surface model of the heart in the image, wherein the surface model comprises surface elements being triangles. For each surface element candidate points are sampled along a line perpendicular to the respective surface element and for each of these candidate points the likelihood is determined that it corresponds to a boundary of the heart, wherein then the candidate point with the highest likelihood is selected and the position of the respective surface element is adapted accordingly. For the selection of the candidate point with the highest likelihood triangle-specific acceptance criteria can be used like the criteria disclosed in the article "Optimizing boundary detection via Simulated Search with applications to multi-modal heart segmentation" by J. Peters et al., Medical Image Analysis, volume 14, pages 70-84 (2010). This model-based segmentation does not always provide good segmentation results.

SUMMARY OF THE INVENTION

It is an object of the present invention to provide a segmentation system, method and computer program which allow for an improved segmentation of an object in an image. It is a further object of the present invention to provide a training system, method and computer program for training a neural network, which can be used for providing the improved segmentation.

In a first aspect of the present invention a segmentation system for segmenting an object in an image is presented, wherein the segmentation system comprises:
an image providing unit for providing an image of an object, the image representing an image volume,
a model providing unit for providing a deformable surface model for being adapted to a surface of the object, wherein the surface model comprises surface elements defining respective parts of a mesh surface,
a subvolumes determination unit for placing the surface model within the image and for determining for each surface element of the surface model a respective subvolume of the image such that the respective subvolume overlaps with the respective surface element,
a neural network providing unit for providing a convolutional neural network being adapted to determine distances between surface elements of the surface model and a boundary of the object in the image based on determined subvolumes,
a distance determination unit for determining respective distances between the surface elements of the provided and placed surface model and the boundary of the object in the provided image by using the provided neural network based on the determined subvolumes, and
a model adaptation unit for adapting the surface model to the object in the image in accordance with the determined distances.

By determining for a respective surface element a respective subvolume, by using the subvolumes together with the convolutional neural network for determining the distances between the surface elements and the boundary of the object in the image and by then using these distances for adapting the surface model, the segmentation of the object in the image is improved in comparison to known techniques which rely, for instance, on a sampling of candidate points along lines being perpendicular to the respective surface element and on a determination of likelihoods for the candidate points that they indicate a boundary of the object.

The image providing unit can be a storing unit, in which the image of the object is stored, and from which the image can be retrieved for providing the same. The image providing unit can also be a receiving unit for receiving an image of the object and for providing the received image. Moreover, the image providing unit can be an image generation unit being adapted to determine the image based on raw data of the object. The image providing unit can also be an entire imaging system being adapted to acquire the raw data and determine, in particular, reconstruct, the image based on the raw data.

In an embodiment the neural network providing unit is adapted to provide a further convolutional neural network being adapted to determine confidence values for surface elements of the surface model based on the subvolumes, wherein a confidence value for a respective surface element is indicative of an estimation of a deviation of the distance determined for the respective surface element from the actual distance of the respective surface element to the boundary of the object in the image, wherein the segmentation system further comprises a confidence value determination unit for determining confidence values for the surface elements of the surface model by using the provided further neural network based on the determined subvolumes. In particular, the model adaptation unit is adapted to adapt the surface model in accordance with the determined distances and based on the respective confidence value determined for the respective surface element. For instance, the model adaptation unit can be adapted to allow a distance determined for a respective surface element, for which a relatively large confidence value has been determined, to contribute stronger to the adaptation process than a distance determined for a respective surface element for which a relatively low confidence value has been determined. Accordingly, the degree of contribution to the adaptation process of a distance determined for a respective surface element may depend on the confidence value determined for the respective surface element. This can lead to a further improved segmentation of the object in the image.

In an embodiment the neural network providing unit comprises several convolutional neural networks which are adapted to be used for different surface models representing different kinds of objects and/or for different groups of surface elements of a same surface model, wherein the neural network providing unit is adapted to provide, for determining distances for all surface elements of a surface model representing the object or for a group of surface elements of the surface model representing the object, the corresponding neural network. Thus, for different parts of a same object, different neural networks might be used for segmenting the object. Moreover, for segmenting the respective object, a neural network might be used, which is specifically adapted for the class of objects, to which the object to be segmented belongs to. This can lead to a further improved determination of the distances between the respective surface elements and the boundary of the object in the image and hence finally to a further improved segmentation of the object in the image.

The model providing unit is preferentially adapted to provide the surface model such that each surface element comprises a direction, wherein the distance determination unit is adapted to determine the respective distance in the direction of the respective surface element. Moreover, preferentially the model providing unit is adapted to provide a triangle mesh as the surface model, wherein the surface elements are triangles. However, the surface model can also be another mesh, wherein the surface elements can have another shape not being triangular. The object is preferentially an anatomical object like an organ or another part of a human being or of an animal. However, the object can also be a technical object.

In particular, the model providing unit provides the surface model such that for each surface element a respective three-dimensional orthogonal coordinate system is defined, wherein one axis of the coordinate system coincides with the normal of the respective surface element. The direction of the axis, which is aligned with the normal, can be arbitrarily defined and defines the direction of the respective surface element. For instance, if the surface element is a triangle having a first vertex, a second vertex and a third vertex, the direction of the axis, i.e. the orientation, might be defined by the cross product of a) a vector pointing to the second vertex minus a vector pointing to the first vertex and b) a vector pointing to the third vertex minus a vector pointing to the first vertex.

The surface elements are preferentially planar and the two further axes are preferentially located in the respective plane of the respective surface element. For instance, the center of the coordinate system can coincide with the center of the respective surface element, wherein the first axis is aligned with the normal, the second axis is within the plane of the respective surface element and points from the center to one vertex of the surface element and the third axis can be orthogonal to the first and second axes.

The subvolumes determination unit is preferentially adapted to determine the subvolumes such that they are defined with respect to the coordinate system of the respective surface element. For instance, the respective subvolume can be rectangular having three axes, wherein one of these axes can coincide with the first axis of the coordinate system of the respective surface element being aligned with the normal of the respective surface element. Or, in another example, the respective subvolume can be cylindrical and the longitudinal axis of the cylindrical subvolume can coincide with the first axis of the coordinate system of the respective surface element. Since the respective subvolume is preferentially defined with respect to the coordinate system of the respective surface element, the subvolumes are preferentially independent of the pose and position of the object in the image. Correspondingly, also the input to the neural network is preferentially independent of the pose and position of the object in the image, thereby simplifying the neural-network-based segmentation of the object in the image.

The distance determination unit is preferentially adapted to determine signed distances, wherein the sign is a sign with respect to the axis of the coordinate system of the respective surface element, which is aligned with the normal of the respective surface element. The sign defines in which direction the boundary of the object is present in the provided image with respect to the surface element, i.e., for instance, whether the boundary is "above" or "below" the respective surface element, or, in other words, in which direction the respective surface element needs to be moved by the model adaptation unit, in order to adapt the surface model to the boundary of the object in the provided image. For instance, it can be defined that, if the respective sign is positive, the respective surface element needs to be moved in the direction of the axis of the coordinate system being normal to the respective surface element and, if the respective sign is negative, the respective surface element needs to be moved in a direction being opposite to a direction of the axis of the coordinate system being normal to the respective surface element.

In an embodiment the subvolumes determination unit is adapted to determine the subvolumes such that they are elongated. Furthermore, the model providing unit can be adapted to provide the surface model such that each surface element comprises, as explained above, a direction, wherein the subvolumes determination unit is adapted to determine the subvolumes such that they are elongated in the direction of the respective surface element. In particular, the corresponding elongation direction is preferentially aligned with the first axis of the coordinate system of the respective surface element being aligned with its normal. However, in another embodiment the subvolumes can also be not non-elongated. For instance, they can be cubical or spherical. Moreover, it is preferred that the subvolumes determination unit is adapted to determine the subvolumes such that they have the same dimensions and the same shape. By using the same dimensions and the same shape the computational efforts can be reduced.

In an embodiment the neural network providing unit is adapted to provide the convolutional neural network such that it is adapted to additionally determine further quantities being related to the image of the object based on the subvolumes of the image, wherein the distance determination unit is also adapted to determine the further quantities by using the provided neural network based on the determined subvolumes. In particular, the neural network providing unit and the distance determination unit can be adapted such that the further quantities include the normals of the boundary of the object in the image.

The model adaptation unit is adapted to adapt the surface model by considering the determined distances and optionally normals of the boundary of the object in the image. In particular, the model adaptation unit can be adapted to use an adaptation algorithm having a term in its cost function which tries to attract the respective surface element to a respective target point defined by the determined distance. For instance, the respective target point can be defined by the respective distance and the respective axis of the coordinate system being aligned with the normal of the respective surface element, wherein the target point is the point on the respective axis, which has the respective distance to the respective surface element. In a further embodiment the model adaptation unit is adapted to use a cost function with a term that tries to attract the respective surface element not to the target point, but to a target plane approximating a tangent plane, wherein the target plane is preferentially defined by the corresponding normal of the boundary of the object, i.e. the normal is perpendicular to the target plane, and the respective distance. This attraction to the target plane and not to the target point allows the respective surface element to "slide" on the boundary of the object, which can lead to an improved adaptation of the surface model to the object in the image. In general, the model adaptation unit is preferentially adapted to use a cost function having different terms, wherein the adaptation process is carried out by minimizing the cost function. The cost function comprises a term which depends on the determined distances, wherein this term is reduced, if the distance between the surface elements and the boundaries are reduced. This term tries to, for instance, attract the respective surface element to a target point defined by the respective determined distance or to a target plane defined by the respective determined distance and normal. Furthermore, the model adaptation unit can be adapted to use an adaptation algorithm having a term in its cost function which tries to orient the respective surface element such that it is parallel to the target plane approximating the tangent plane. The cost function can comprise further terms like a term which tries to keep a certain shape of the surface model. The terms of the cost function might also be regarded as being "energies", i.e. one of these terms might be regarded as being an internal energy and another of these term might be regarded as being an external energy. For more details regarding the adaptation of the surface model reference is made to known adaptation algorithms like the algorithms disclosed in the above mentioned articles by O. Ecabert et al. and J. Peters et al.

In an embodiment the neural network providing unit is adapted to provide a single convolutional neural network being adapted to determine distances to the boundary of the object for all surface elements of the surface model, wherein the distance determination unit is adapted to determine the respective distances between the surface elements of the surface model and the boundary of the object in the image by using the provided single neural network based on the determined subvolumes. Moreover, in an embodiment the image providing unit is adapted to provide the image such that each image element comprises two or more image values. In particular, the image providing unit can be adapted to provide the image such that the image values of a same image element correspond to different imaging modalities or to different used image acquisition protocols of a same imaging modality. If a single image element, i.e., for instance, a single voxel, comprises two or more image values, the information of each image element is increased in comparison to having only a single image value for a single image element. This increased information provided by the image can lead to a further improved determination of the distances between the surface elements of the surface model and the boundary of the object in the image, particularly if the different image values of a same image element correspond to different imaging modalities which often emphasize different aspects of a same object. In the case of providing an image, wherein a single image element has several image values, the neural network preferentially has also been trained with images having several image values in a single image element.

The subvolumes determination unit is preferentially adapted to determine the subvolumes by sampling the image. In an embodiment the image is sampled such that a degree of sampling depends on a distance from a center of the respective subvolume. In particular, the image is sampled such that a degree of sampling decreases with increasing distance from a center of the respective subvolume. For instance, if the subvolumes are rectangular, the image can be sampled such that a degree of sampling decreases with increasing a distance from the normal of the respective surface element at the center of the respective subvolume in a direction being parallel to the respective surface element.

The subvolumes are preferentially rectangular. However, in an embodiment they can be cylindrically shaped. In particular, the subvolumes determination unit can be adapted to determine the subvolumes by sampling the image such that a degree of sampling along a ring shaped part of the cylinder depends on the radius of the ring. For instance, the sampling rate can be reduced with increasing distance to the center of the respective surface element, wherein the resulting reduced overall sampling rate can lead to reduced computational efforts needed for segmenting the object in the image. The reduction of the sampling rate corresponds to an increase of gaps between samples. In an embodiment a fixed number of samples is used for all rings such that with increasing diameter naturally also the gap between the samples is increased, where the increase in gap directly relates to the distance of a sample from the center line of the cylinder. Alternatively, if the subvolumes are rectangular, rectangles, particularly squares, of increasing size in a plane being perpendicular to the respective surface element might be used while always sampling the same amount of sample points. Preferentially, for different surface elements the same sampling pattern is used for determining the different subvolumes, wherein this sampling pattern might be a hexagonal pattern or another pattern. If the subvolumes are cylindrical, the sampling pattern might be defined by two or more rings, wherein the samples on neighboring rings are shifted with respect to each other in a direction being orthogonal to the radius.

In an embodiment the segmentation system further comprises a training data providing unit for providing a training image showing a training object and for providing a deformable training surface model which comprises several surface elements and which has been adapted to the training object, and a training unit for a) determining several modified training surface models by modifying surface elements of the adapted training surface model, b) determining subvolumes of the training image for the surface elements of the modified training surface models, wherein for a respective surface element a subvolume is determined, which overlaps the respective surface element, c) determining distances for the surface elements of the modified training surface models, wherein for a respective surface element a respective distance to the un-modified training surface model, which has been adapted to the training object in the training image, is determined, and d) training the provided convolutional neural network based on determined subvolumes and determined distances. Thus, the segmentation system cannot only be adapted to segment the object, but also to train a new or an already trained convolutional neural network for the segmentation procedure.

In a further aspect of the present invention a training system for training a neural network is presented, wherein the training system comprises:
    a neural network providing unit for providing a convolutional neural network,
    a training data providing unit for providing a training image showing a training object and for providing a deformable training surface model which comprises several surface elements and which has been adapted to the training object, a training unit for training the provided neural network, wherein the training unit is adapted to:

a) determine several modified training surface models by modifying surface elements of the adapted training surface model, b) determine subvolumes of the training image for the surface elements of the modified training surface models, wherein for a respective surface element a subvolume is determined, which overlaps the respective surface element, c) determine actual distances for the surface elements of the modified training surface models, wherein for a respective surface element a respective distance to the un-modified training surface model, which has been adapted to the training object in the training image, is determined, d) train the provided convolutional neural network based on the determined subvolumes and the determined actual distances.

The training data providing unit is preferentially a storing unit in which the training image and the adapted training surface model are stored and from which the training image and the adapted training surface model can be retrieved for providing the same. However, the training data providing unit can also be a receiving unit for receiving the training image and the adapted training surface model from another unit and for providing the received training image and adapted training surface model.

Preferentially the training unit is adapted to displace a surface element and/or tilt a surface element for modifying the surface element. In this way several modified training surface models, which can be used for the training, can be determined in a relatively simple way. In particular, an unlimited amount of modified training surface models having known distances to the boundary of the training object can be generated for the training procedure as ground truth, in order to train the neural network as extensive as desired. This can lead to a very well trained neural network and hence to a very exact segmentation, if this neural network is used for segmenting an object in an image.

In an embodiment the training unit is adapted to a) determine simulated distances for the surface elements of the modified training surface models based on the determined corresponding subvolumes and the trained convolutional neural network and b) determine deviation values for the surface elements of the modified training surface models, wherein for a respective surface element a respective deviation value is determined, which is indicative of a deviation of the respective simulated distance from the respective actual distance, wherein the neural network providing unit is adapted to provide for surface elements, for which the respective deviation value is larger than a threshold, a further convolutional neural network, wherein the training unit is adapted to train the provided further convolutional neural network based on the subvolumes and the actual distances determined for the surface elements for which the respective deviation value is larger than the threshold. Thus, for different parts of the same object different neural network can be trained, wherein the respective neural network is optimized for the respective part of the object. If the correspondingly trained neural networks are used for segmenting an object in an image, the segmentation can be further improved.

In an embodiment the training unit is adapted to a) determine simulated distances for the surface elements of the modified training surface models based on the determined corresponding subvolumes and the trained convolutional neural network, and b) determine confidence values for the surface elements of the modified training surface models, wherein for a respective surface element a respective confidence value is determined based on a deviation of the respective simulated distance from the respective actual distance, wherein the neural network providing unit is adapted to provide a further convolutional neural network for determining confidence values for surface elements of a surface model of an object based on the subvolumes, wherein the training unit is adapted to train the further convolutional neural network based on the confidence values and the subvolumes of the training image determined for the surface elements of the training surface model. Thus, the training can also result in a confidence neural network, which provides confidence values during a segmentation process, wherein these confidence values can be used for further improving an adaptation of a model surface to an object in an image and hence can lead to a further improved segmentation. The confidence values preferentially depend on the deviations such that the larger the deviation the smaller the confidence values.

In another aspect of the present invention a segmentation method for segmenting an object in an image is presented, wherein the segmentation method comprises:

providing an image of an object by an image providing unit, the image representing an image volume, providing a deformable surface model for being adapted to a surface of the object, wherein the surface model comprises several surface elements, by a model providing unit, placing the surface model within the image and determining for each surface element a respective subvolume of the image such that the respective subvolume overlaps with the respective surface element by a subvolumes determination unit, providing a convolutional neural network being adapted to determine distances between surface elements of the surface model and a boundary of an object in an image based on determined subvolumes by a neural network providing unit, determining respective distances between the surface elements of the provided and placed surface model and a boundary of the object in the provided image by using the provided neural network based on the determined subvolumes by a distance determination unit, and adapting the surface model in accordance with the determined distances by a model adaptation unit.

In a further aspect of the present invention a training method for training a neural network is presented, wherein the training method comprises:

providing a convolutional neural network by a neural network providing unit, providing a training image showing a training object and providing a deformable training surface model which, comprises several surface elements and which has been adapted to the training object, by a training data providing unit, training the provided neural network by a training unit, wherein the training includes:

a) determining several modified training surface models by modifying surface elements of the adapted training surface model, b) determining subvolumes of the training image for the surface elements of the modified training surface models, wherein for a respective surface element a subvolume is determined, which overlaps the respective surface element, c) determining actual distances for the surface elements of the modified training surface models, wherein for a respective surface element a respective distance to the un-modified training surface model, which has been adapted to the training object in the training image, is determined, d) training the provided convolutional neural network based on the determined subvolumes and the determined actual distances.

In a further aspect of the present invention a segmentation computer program for segmenting an object in an image is presented, wherein the computer program comprises program code means for causing a segmentation system as defined in claim 1 to carry out the steps of the segmentation method as defined in claim 12, when the computer program is run on a computer controlling the segmentation system.

In another aspect of the present invention a training computer program for training a neural network is presented, wherein the computer program comprises program code means for causing a training system as defined in claim 10 to carry out the steps of the training method as defined in claim 13, when the computer program is run on a computer controlling the training system.

It shall be understood that the segmentation system of claim 1, the training system of claim 10, the segmentation method of claim 12, the training method of claim 13, the segmentation computer program of claim 14 and the training computer program of claim 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
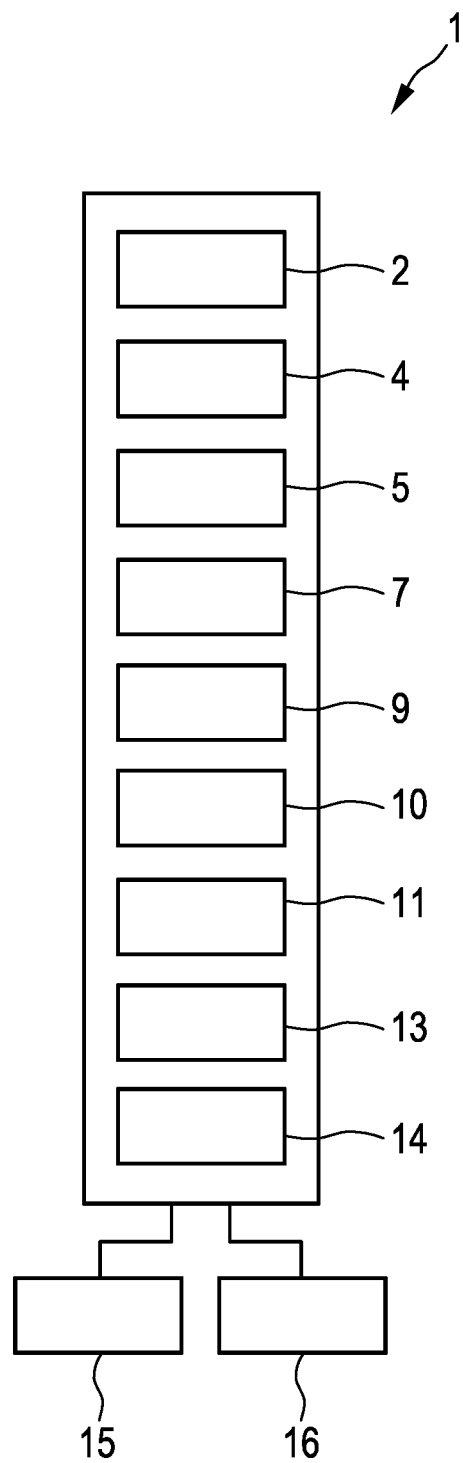
FIG. 1 shows schematically and exemplarily an embodiment of a segmentation system for segmenting an object in an image.

FIG. 1 shows schematically and exemplarily an embodiment of a segmentation system for segmenting an object in an image. In this embodiment the object is a cortex of a human head and the image is a magnetic resonance (MR) image. The segmentation system comprises an image providing unit 2 for providing the image of the object, wherein in this embodiment the image providing unit 2 is a storing unit in which the MR image of the cortex is stored and which is adapted to provide the stored MR image. The segmentation system 1 further comprises a model providing unit 4 for providing a deformable surface model (also referred to as 'adaptable surface model') for being adapted to a surface of the cortex, wherein the surface model comprises several surface elements. In this embodiment the surface model is a mesh of triangles, wherein the surface elements are the triangles of the mesh. The segmentation system 1 also comprises a subvolumes determination unit 5 for initially placing the mesh within the MR image and for determining for each triangle of the mesh a respective subvolume of the MR image such that the respective subvolume overlaps with the respective triangle. Such initial placing may, for example, comprise positioning the deformable surface model in the image, for example at a default position or at the position of the object in the image. In some embodiments, such initial placing may also involve globally scaling the deformable surface model to the object in the image. In some embodiments, the initial placing may involve a global registration of the deformable surface model to the object in the image. Such initial placing typically does not involve locally deforming the surface model to better fit the object in the image; the latter is typically a subsequent step, which in this specification and in the field of image segmentation may also be referred to as 'adapting' or 'fitting' of the deformable surface model.

In this embodiment each surface element, i.e. each triangle, comprises a direction being defined by the normal of the respective surface element, wherein the subvolumes are elongated and are determined such that they are elongated in the direction of the respective surface element.

Moreover, the subvolumes determination unit 5 is adapted to determine the subvolumes such that they all have the same dimensions and the same shape. Furthermore, the subvolumes determination unit 5 is preferentially adapted such that the center of the respective subvolume coincides with the center of the respective surface element. In the upper left part of FIG. 2 some of the subvolumes 6 are schematically and exemplarily illustrated with respect to the surface model 3, i.e. with respect to the mesh.

Figure 3:
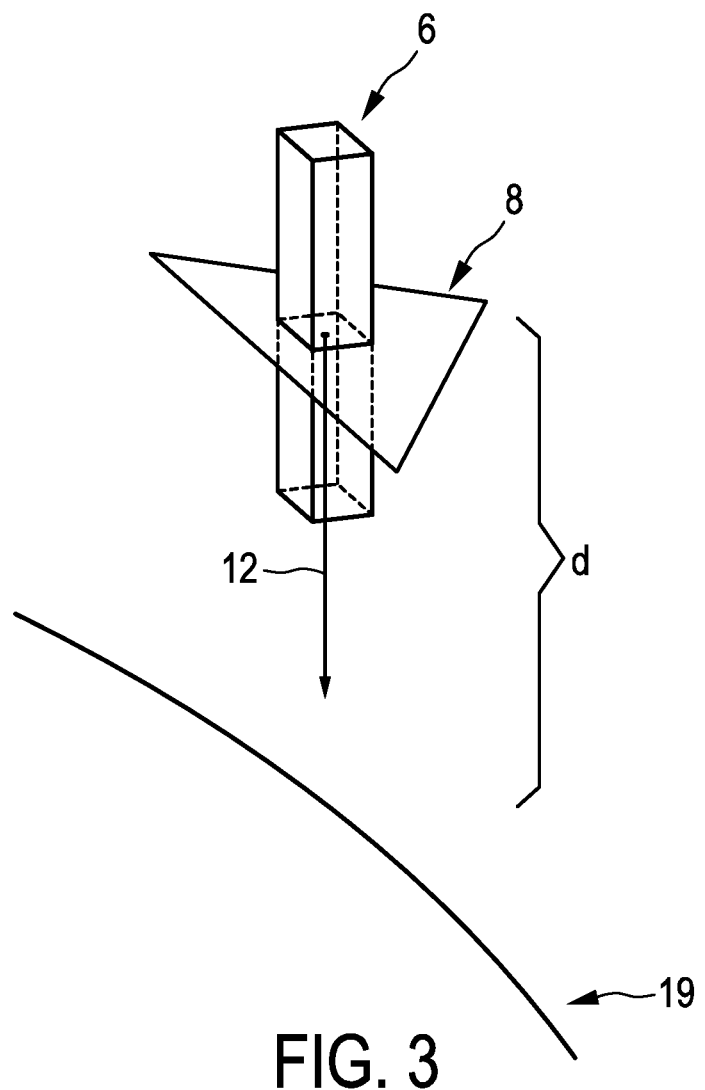
FIG. 3 shows schematically and exemplarily a triangular surface element, a corresponding subvolume and the distance to a boundary of the object to be detected in the image.

The segmentation system 1 further comprises a neural network providing unit 7 for providing a convolutional neural network being adapted to determine distances between the surface elements of the surface model and a boundary of the object in the image based on the determined subvolumes 6. This is illustrated in FIG. 3, where a subvolume 6 is shown, which has been determined for the triangle 8, wherein the distance d between the center of the triangle 8 and the position, where the normal 12, which traverses the center of the triangle 8, meets the boundary 19 of the cortex in the provided image, is determined. Although in FIG. 3 the base of the subvolume 6 is smaller than the area of the triangle 8, in another embodiment the subvolume might also have a base being larger than the area of the triangle, wherein in this case the intersection area of the respective subvolume with the respective triangle would be triangular and not rectangular as shown in FIG. 3.

Moreover, the segmentation system 1 comprises a distance determination unit 9 for determining respective distances d between the surface elements 8 of the surface model 3 and the boundary 19 of the object in the image by using the provided neural network based on the determined subvolumes 6. Thus, the subvolumes 6 are used as an input for the neural network, whereafter the neural network provides a respective distance d for each surface element. In particular, the distance determination unit 9 is adapted to collect all subvolumes 6 in a multi-dimensional array 50, i.e. to collect all profiles 6 in a multi-dimensional array 50, wherein the provided convolutional neural network 51 is a fully convolutional neural network, i.e. all layers of the neural network are convolutional layers, and wherein this fully convolutional neural network 51 is applied to the multi-dimensional array 50 for determining the distances d. This will in the following be explained in more detail with reference to FIG. 2.

Figure 2:
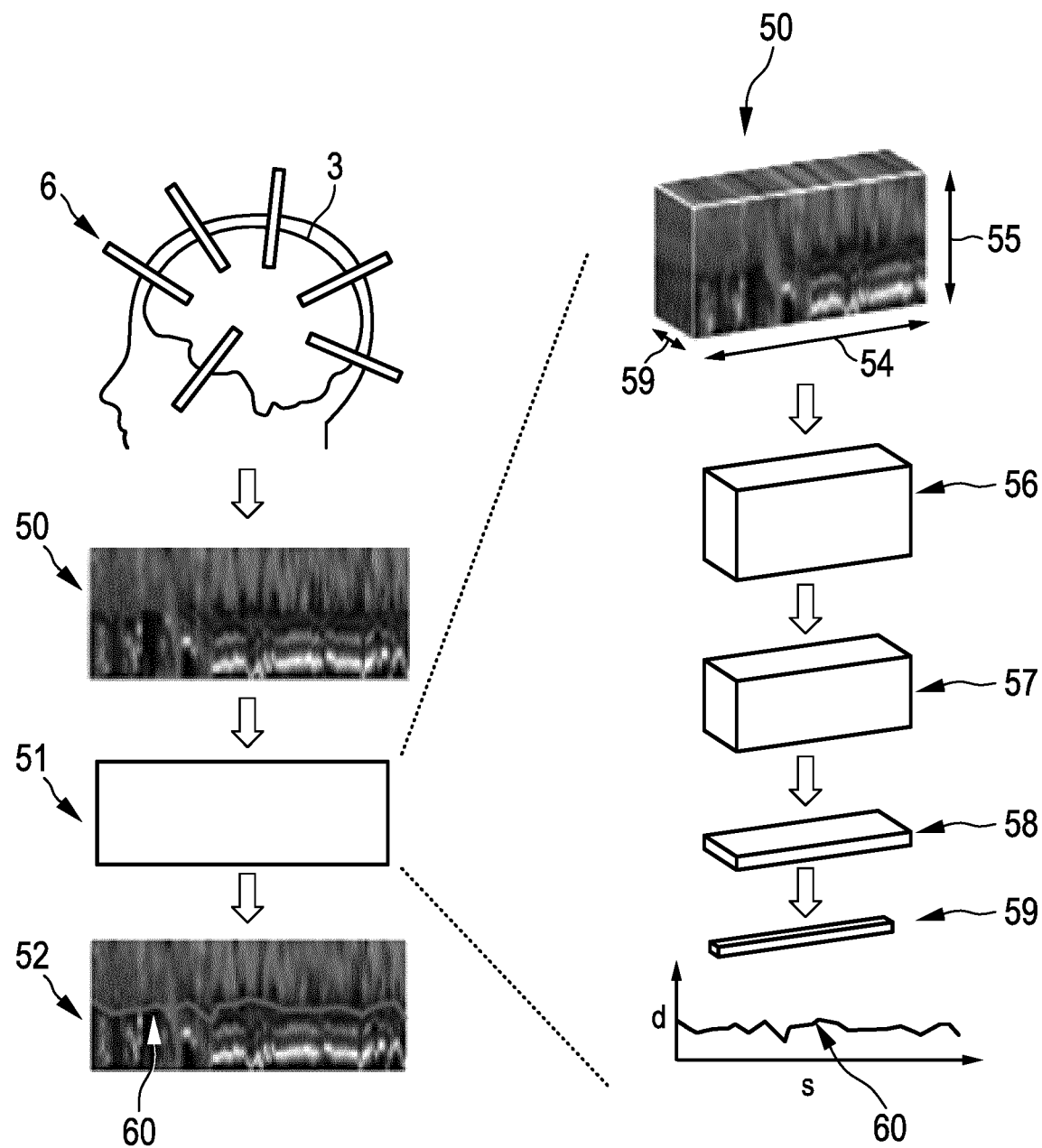
FIG. 2 illustrates the segmentation of the object in the image.

In FIG. 2 on the left hand side an illustration is given in two dimensions for simplicity. Meaning, the extracted subvolumes 6 are in fact three-dimensional, although they are just drawn as two-dimensional rectangles. In FIG. 2 on the right hand side more details about the actual architecture are illustrated and also the respective dimensions of a three-dimensional array are shown and how those dimensions are collapsed through the application of several convolutional layers in order to yield a single one-dimensional column, where each value corresponds to a distance value of the respective triangle.

In FIG. 2 reference sign 59 indicates the number of voxels per slice of a subvolume, wherein the term "slice" in this context refers to all voxels of a subvolume that lie within a plane orthogonal to the triangle normal, i.e. in this example the surface elements are triangles. For cuboidal subvolumes, a slice is a rectangle, for cylindrical subvolumes, a slice would be a disc. Moreover, in FIG. 2 reference sign 54 indicates the number of triangles, i.e. the number of surface elements, of the surface model and reference sign 55 refers to the number of slices per subvolume.

A natural way of collecting the voxel intensities of many three-dimensional subvolumes would be in one four-dimensional array, where the first dimension of the array is the triangle index and the other three dimensions are the three dimensions of the three-dimensional subvolumes. However, since in this example only the dimension of the subvolumes that is aligned with the triangle normal is of special interest, one dimension is removed by collecting all voxels of one slice in a one-dimensional vector. For example, the voxel values of a 40×5×5 subvolume can be rearranged into a 40×25 subvolume by rearranging all voxels of a 5×5 slice into a one-dimensional vector with 25 vector elements. Thus, for a mesh, i.e. a surface model, consisting of, for instance, 6000 triangles, the intensity values of the corresponding 6000 three-dimensional subvolumes with dimension 40×5×5 can be collected in one three-dimensional array with the dimension 6000×50×25, where the first dimension indexes the respective triangle, the second dimension indexes a slice within a three-dimensional subvolume and the last dimension contains all voxels for a particular slice. This is represented by the three-dimensional array 50 illustrated in, for instance, the upper right part of FIG. 2. Serializing all voxels within a slice has the added advantage of generalizing to different within-slice sampling schemes. For example, points within a slice can be sampled on concentric rings with increasing distance and then all sample points can be collected in a one-dimensional vector.

Figure 4:
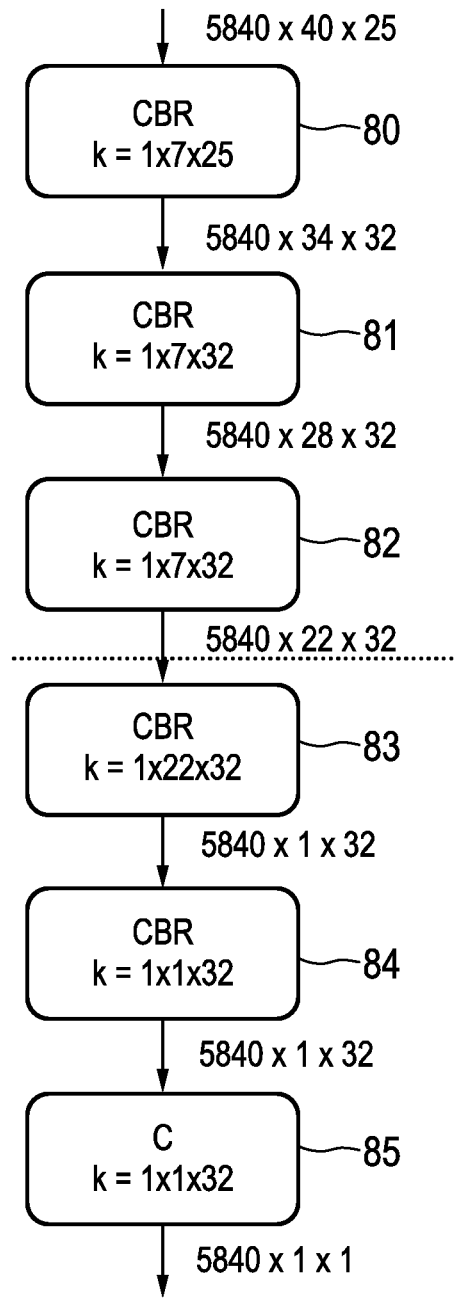
FIG. 4 illustrates aspects of a neural network used by the segmentation system.

Preferentially, per triangle features are extracted, wherein the features are learned as part of the convolutional neural network, where each convolutional layer of the network acts as a trainable feature extractor. An example of a network architecture will in the following be illustrated with reference to FIG. 4.

In this example it is assumed that the mesh, i.e. the surface model, consists of 5840 triangles and that for each triangle a subvolume of dimension 40×5×5 is extracted. The voxel intensities are then collected in a 5840×40×25 array, which in this example is the input into the neural network. The network is divided into blocks of convolutional, batch normalization, and rectified linear unit (ReLU) layers with different kernel sizes, wherein in FIG. 4 the boxes represent operations of layers of the neural network and wherein in each box with the label "CBR" operations of convolutional, batch normalization and ReLU layers are combined to simplify the drawing. Moreover, in FIG. 4 the box 85 with the label "C" represents an operation of a convolutional layer only. The first three layers 80, 81, 82 calculate a convolution with a 1×7×25, 1×7×32, and 1×7×32 kernel, respectively. Since valid convolutions are used, the size of the three-dimensional array is reduced from 5840×40×25 to 5840×22×32. Moreover, since the first dimension of the used kernels is 1, the sequence of convolutions does not change the size of the first dimension of the three-dimensional array. Thus, a response for each triangle is calculated, without losing some triangles along the way. After the first three convolutions all dimensions of the three-dimensional array are still larger than one, wherein the number of elements in the second dimension has been reduced. This is indicated in FIG. 2 by the boxes 56 and 57. The first three convolutional layers 80, 81, 82 are followed by a convolutional layer 83 with a kernel whose second dimension is equal to the second dimension of its input. As a result, the dimension along the triangle normal of the input is collapsed to 1. Consequently, the effective dimensionality of the three-dimensional volume is only 2, which in FIG. 2 is indicated by the flat box 58 in the three-dimensional space. Similarly, the last convolutional layer 85 collapses the last dimension of the array and produces a 5840×1×1 dimensional array indicated in FIG. 2 by reference number 59, only containing a single value per triangle, namely the predicted distance of the respective triangle to the boundary of the object. The box 84 represents an operation of another convolutional layer with kernel size 1×1×32. Since this layer does not convolve over any axis other than the channel axis, it could also be seen as an additional per-triangle dense layer and it serves the same purpose as regular dense layers do in classification/regression networks. Namely, it increases the non-linearity of the network and allows the network to learn more complex dependencies between the input and the output of the network. Other than that, there is nothing special about the operation of the layer represented by box 84 (unlike boxes 83 and 85 representing operations of layers which also change the data layout).

The features that are used to estimate the distances are defined by the convolutional kernels, which are automatically learned during the training procedure and preferentially tuned for a specific combination of input modalities and target object. The features are defined by the learned convolutional kernels and depend on the type of input modality and target boundary. It would make sense for the network to learn edge-like feature in the first layers, but this behavior is not hard-coded and can vary depending on the input modality and type of target boundary.

The result of a convolutional layer is regarded as being a feature response, because calculating a convolution is regarded as a feature extraction step, where here the concept of a feature is rather abstract. The convolutional kernel is regarded as being a feature detector. In the here exemplarily described network architecture, the responses of all feature detectors are collected in the last dimension. A value at location (i,j,k) in box 56 or box 57 defines how strongly feature k of the respective layer responded at distance j for triangle i. Those features can be simple edge features that respond at a particular location for a particular triangle if an edge can be observed at that location. Since these are features that are useful very early in the feature extraction pipeline, they can be regarded as being low-level features. Box 58 does not contain feature responses for different displacement candidates, but only feature responses of different filters for different triangles. Those features are necessarily much more abstract than the simple edge features of the first layers. Therefore, they can be regarded as being high-level features. The determination of the high-level features depending on the low-level features can be regarded as being integration, wherein the integration procedure is learned by the neural network, wherein each high-level feature is a combination of low-level features of different displacement candidates. How those features are combined is defined by the convolutional kernel which is learned during training.

The concept described in this example is similar to the integration of displacement candidates, where the collapse of the displacement axis forces the network to learn to integrate different displacement candidates. Likewise, the last layer collapses the feature dimension, which forces the network to learn to integrate many features per triangle into a single response. Since this response is trained with the objective to minimize the difference of the predicted value with the known distance of the triangle with the boundary, the network is forced to learn object distances and the last layer in particular is forced to learn to integrate features into distance estimates.

It should be noted that there is no concept in this architecture that explicitly calculates distances. The reason why the neural network finally outputs distances d for different triangles s (cf. curve 60 in FIG. 2) is because the network was trained to predict distances. That is, the output of the network depends more on the used objective function than the actual architecture of the network. The finally determined distances 60 are also schematically shown overlaid over the input array of subvolumes in the lower left part of FIG. 2 and indicated there by reference sign "52".

The segmentation system 1 further comprises a model adaptation unit 10 for adapting the surface model 3 in accordance with the determined distances d. For this adaptation process known adaptation algorithms can be used like the adaptation algorithm disclosed in the above mentioned articles by O. Ecabert et al. and by J. Peters et al. These algorithms or other known adaptation algorithms can be used especially to modify the mesh of triangles such that it is adapted to target points defined by the determined distances and the triangle normals.

In this embodiment the neural network providing unit 7 is adapted to provide, for the determination of the distances for all surface elements of the surface model, a single convolutional neural network, wherein the distance determination unit 9 is adapted to determine the respective distances between the surface elements 8 of the surface model 3 and the boundary 19 of the object in the image by using the provided single neural network based on the determined subvolumes. However, the neural network providing unit 7 can also be adapted to provide several neural networks for different groups of surface elements of the same surface model 3, wherein the distance determination unit 9 is then adapted to collect for each neural network the subvolumes, which have been determined for the surface elements of the respective group of surface elements, in order to determine a respective multi-dimensional array 50 of respective subvolumes, which is then used by the respective neural network for determining the distances of the surface elements of the respective group. The neural network providing unit 7 can also comprise several convolutional neural networks which are adapted to be used for different surface models representing different kinds of objects, wherein the neural network providing unit 7 can be adapted to provide the respective neural network, which corresponds to the kind of the actual object to be segmented in the image.

The neural network providing unit 7 can also be adapted to provide a further convolutional neural network being adapted to determine confidence values for surface elements 8 of the surface model 3 based on the subvolumes 6, wherein a confidence value for a respective surface element 8 is indicative of an estimation of a deviation of the distance determined for the respective surface element 8 from the actual distance of the respective surface element 8 to the boundary 19 of the object in the image, wherein the confidence value is higher if the estimated deviation is smaller. The segmentation system 1 then further comprises a confidence value determination unit 11 for determining confidence values for the surface elements 8 of the surface model 3 by using the provided further neural network based on the determined subvolumes 6. The model adaptation unit 10 can then be adapted to adapt the surface model 3 in accordance with the determined distances d such that during the adaptation a degree of consideration of a respective distance determined for a respective surface element 8 depends on the respective confidence value determined for the respective surface element 8. For instance, while using known model adaptation algorithms like the algorithms disclosed in the above mentioned articles by O. Ecabert et al. and by J. Peters et al., which adapt a surface model to an object based on determined distances, for a respective surface element an attraction of this surface element to a target point defined by the respective determined distance might be disabled, if for this surface element the confidence value was too low, i.e., for instance, smaller than a predefined threshold. Also a weighting of this attraction part of the adaptation algorithm depending on the respective confidence value might be used.

The neural network providing unit 7 may be adapted to provide the convolutional neural network such that it is adapted to additionally determine further quantities being related to the image of the object based on the subvolumes of the image, wherein the distance determination unit 9 can be adapted to also determine the further quantities by using the provided neural network based on the determined subvolumes. In particular, the neural network providing unit 7 and the distance determination unit 9 can be adapted such that the further quantities include a normal of the boundary of the object in the image. Moreover, also the neural network used for determining the distances can be adapted to provide a confidence score, which might also be regarded as being a reliability of the detected boundary, for a respective determined distance.

In an embodiment the distance determination unit or another unit of the segmentation system is adapted to aggregate the confidence score determined for all surface elements or for a part of the surface elements, in order to measure the reliability of the overall segmentation or of a part of the segmentation, respectively. If the segmentation is not reliable enough, a user might be informed accordingly. The distance determination unit or another unit of the segmentation system can also be adapted to use the determined confidence score for identifying regions of the surface model in which the adaptation and hence the segmentation is not reliable enough. For instance, the confidence scores of the surface elements of a region can be averaged and the resulting average confidence score can be compared with a predefined threshold, in order to determine whether the segmentation was reliable enough for this region. The result can be output. For example, a region, for which a segmentation was not reliable enough, could be highlighted on a visualization of the adapted surface model on a display 16.

The segmentation system 1 further comprises a training data providing unit 13 for providing a training image showing a training object and for providing a deformable training surface model, which comprises several surface elements and which has been adapted to the training object. Moreover, the segmentation unit can comprise a training unit 14 for a) determining several modified training surface models by modifying surface elements of the adapted training surface model, b) determining subvolumes of the training image for the surface elements of the modified training surface models, wherein for a respective surface element a subvolume is determined, which overlaps the respective surface element, c) determining distances for the surface elements of the modified training surface models, wherein for a respective surface element, a respective distance to the un-modified training surface model, which has been adapted to the training object in the training image, is determined, and d) training the provided convolutional neural network based on the determined subvolumes and the determined distances. Thus, the segmentation system can also be adapted to train a new convolutional neural network or to further train an already trained convolutional neural network. However, the training of the neural network can also be carried out by a dedicated training system which will be described further below. Also details of the training will be described further below.

The segmentation system 1 also comprises an input unit 15 like a keyboard, a computer mouse, a touchpad et cetera and the display 16 for showing, for instance, the surface model adapted to the object in the image.

Figure 5:
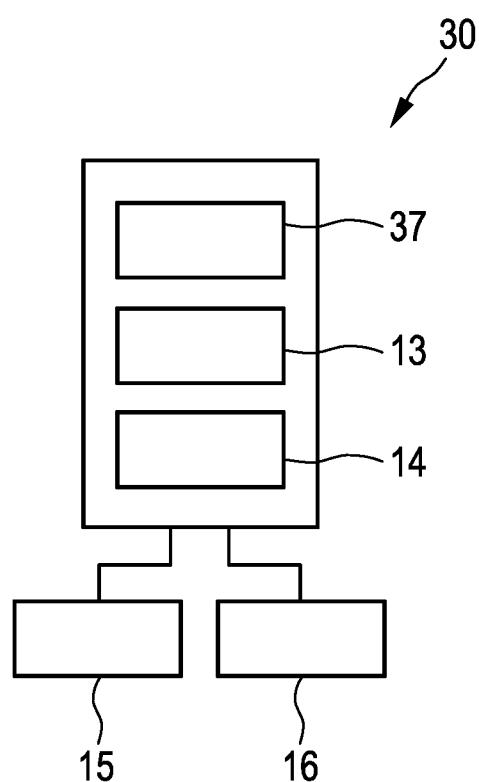
FIG. 5 shows schematically and exemplarily a training system for training a neural network.

FIG. 5 shows schematically and exemplarily an embodiment of a training system for training a neural network. The training system 30 comprises a neural network providing unit 37 for providing a convolutional neural network, wherein in this embodiment the neural network providing unit 37 is a storing unit in which the neural network is stored and which is adapted to provide the stored convolutional neural network. The provided convolutional neural network can be an untrained neural network or a neural network which has already been trained and which should be further trained.

The training system 30 further comprises a training data providing unit 13 for providing a training image showing a training object and for providing an adapted training surface model which comprises several surface elements and which has been adapted to the training object. Moreover, the training system 30 comprises a training unit 14 for training the provided neural network, wherein the training unit 14 is adapted to determine several modified training surface models by modifying surface elements of the adapted training surface model and to determine subvolumes of the training image for the surface elements of the modified training surface models, wherein for a respective surface element a respective subvolume is determined, which overlaps the respective surface element. This modification of the surface elements and this determination of the subvolumes are schematically and exemplarily illustrated in FIGS. 5 and 6.

Figure 6:
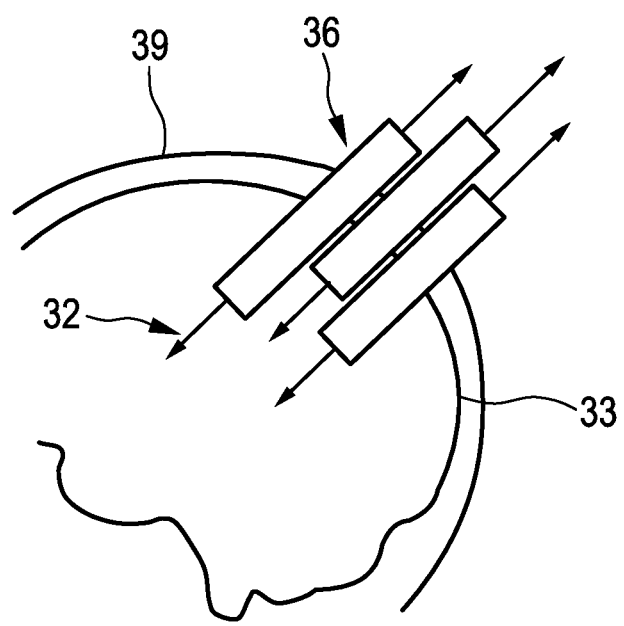
FIGS. 6 and 7 illustrate schematically and exemplarily a generation of a modified training surface model.
Figure 7:
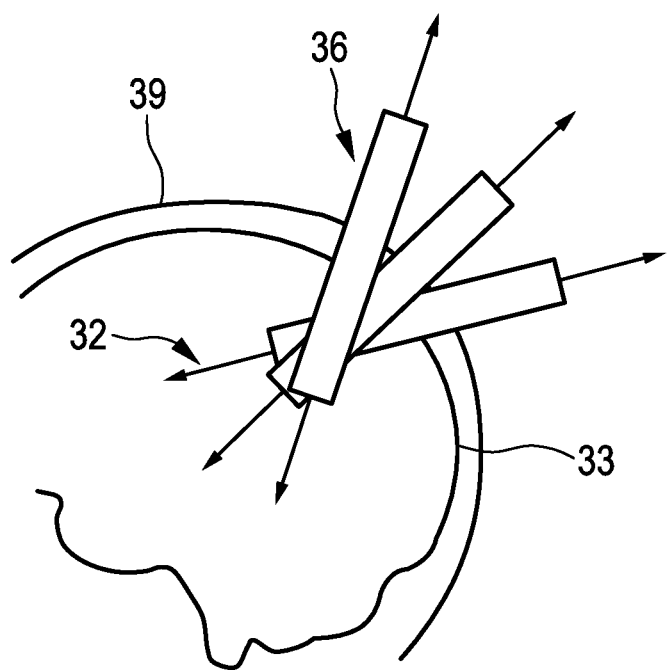

FIGS. 5 and 6 show a cortex 33 of a human head 39 as an example of a training object, wherein in FIG. 6 the determined subvolumes 36 have been determined for surface elements of the training surface model, which have been displaced in the normal directions 32. In FIG. 7 it is illustrated that the surface elements and hence the corresponding determined subvolumes 36 can also be modified by tilting the respective surface elements of the training surface model.

The training unit 14 is further adapted to determine actual distances for the surface elements of the modified training surface models, i.e. of the displaced and/or tilted surface elements, wherein for a respective surface element a respective distance to the un-modified training surface model, which has been adapted to the training object in the training image and which has been provided by the training data providing unit 13, is determined. Moreover, the training unit 14 is adapted to train the convolutional neural network, which has been provided by the neural network providing unit 37, based on the determined subvolumes 36 and the determined actual distances. Thus, the provided convolutional neural network can be trained such that, given the determined subvolumes, deviations between the determined actual distances and the distances output by the convolutional neural network are minimized. This training can be carried out iteratively, wherein in each iteration step the convolutional neural network is trained with another set of subvolumes 36 which have been determined based on modified surface elements of a respective modified training surface model. In other words, in each iteration step another modified training surface model might be used for the training.

The training unit 14 can be further adapted to determine simulated distances for the surface elements of the modified training surface models based on the determined corresponding subvolumes 36 and the trained convolutional neural network and to determine deviation values for the surface elements of the modified training surface models, wherein for a respective surface element a respective deviation value is determined, which is indicative of a deviation of the respective simulated distance from the respective actual distance, wherein the neural network providing unit 37 is adapted to provide for surface elements, for which the respective deviation value is larger than a threshold, a further convolutional neural network, wherein the training unit 14 is adapted to train the provided further convolutional neural network based on the subvolumes and the actual distances determined for the surface elements for which the respective deviation value is larger than the threshold. Thus, for different parts of the training surface model different neural networks can be trained such that later, i.e. during an actual object segmentation procedure, for different parts of an object to be segmented in an image, different convolutional neural networks can be used as explained above.

The training unit 14 can also be adapted to determine simulated distances for the surface elements of the modified training surface models based on the determined corresponding subvolumes 36 and the trained convolutional neural network and to determine confidence values for the surface elements of the modified training surface models, wherein for a respective surface element a respective confidence value is determined based on the deviation of the respective simulated distance from the respective actual distance. The neural network providing unit 37 is then adapted to provide a further convolutional neural network for determining confidence values for surface elements of a surface model of an object based on the subvolumes, wherein the training unit 14 is adapted to train the further convolutional neural network based on the confidence values and the subvolumes of the training image determined for the surface elements of the training surface model. This further convolutional neural network, which might be regarded as being a confidence convolutional neural network, can be used during a segmentation of an object in an image as explained above.

Figure 8:
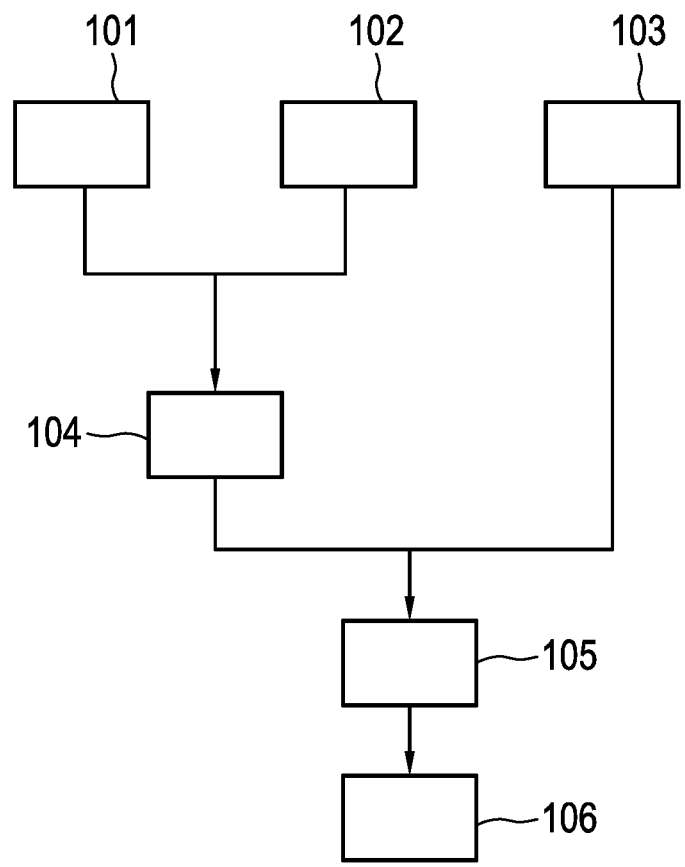
FIG. 8 shows a flowchart exemplarily illustrating an embodiment of a segmentation method for segmenting an object in an image.

In the following an embodiment of a segmentation method for segmenting an object in an image will exemplarily be described with reference to a flowchart shown in FIG. 8.

In step 101 an image of an object is provided by the image providing unit 2. For instance, an MR image of a cortex is provided as the image. In step 102 a deformable surface model for being adapted to a surface of the object is provided by the model providing unit 4, wherein the surface model comprises several surface elements. For instance, a deformable triangle mesh of a cortex is provided by the model providing unit 4. Moreover, in step 103 a convolutional neural network is provided, which is adapted to determine distances between surface elements of the surface model and a boundary of the object in the image based on subvolumes of the provided image, wherein the neural network providing unit 7 provides this convolutional neural network. The provided convolutional neural network has been trained by the training system 30.

In step 104 the provided surface model is placed within the provided image and for each surface element of the surface model a respective subvolume of the image is determined such that the respective subvolume overlaps with the respective surface element, wherein this arranging and this determining is carried out by the subvolumes determination unit 5. In step 105 the distance determination unit 9 determines respective distances between the surface elements of the surface model and the boundary of the object in the image by using the provided neural network based on the determined subvolumes, and in step 106 the provided surface model is adapted in accordance with the determined distances by the model adaptation unit 10, in order to segment the object in the image.

Figure 9:
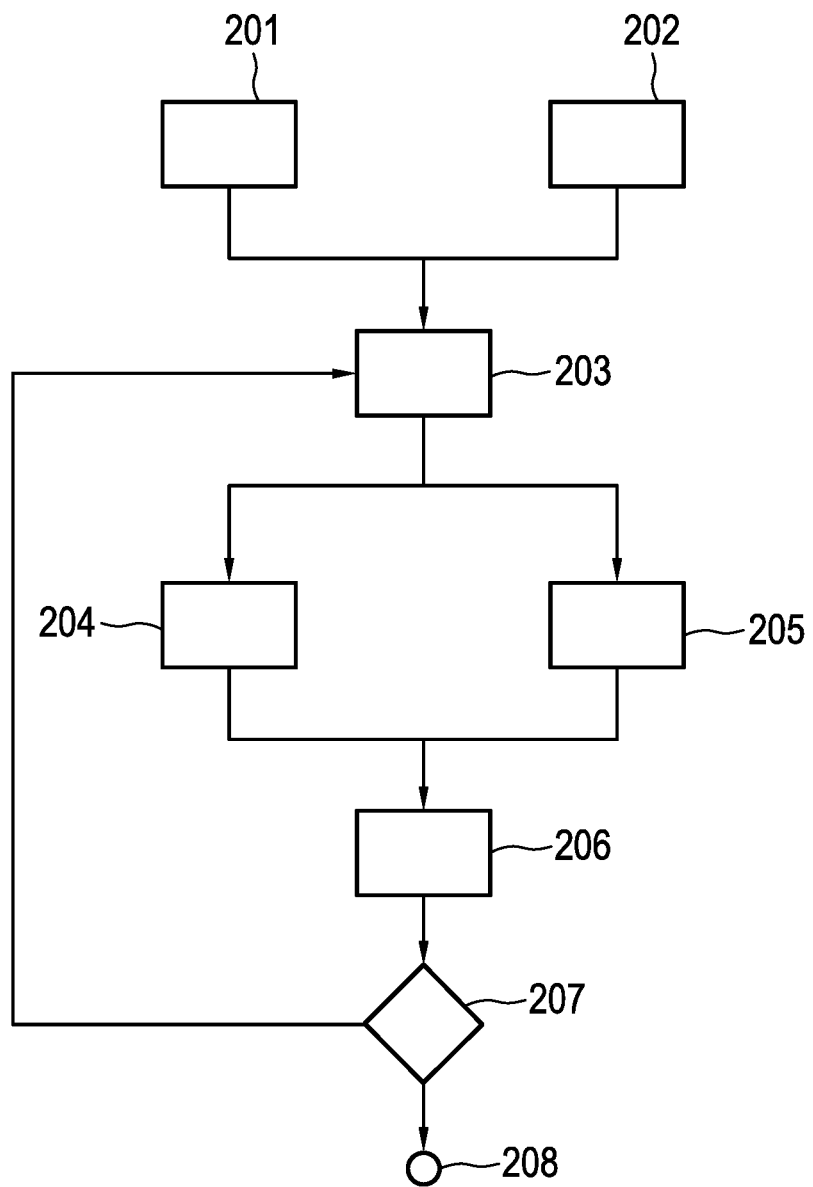
FIG. 9 shows a flowchart exemplarily illustrating an embodiment of a training method for training a neural network.

In the following an embodiment of a training method for training a neural network will exemplarily be described with reference to a flowchart shown in FIG. 9.

In step 201 a convolutional neural network is provided by the neural network providing unit 37 and in step 202 a training image showing a training object and a deformable training surface model are provided by the training data providing unit 13, wherein the provided training surface model comprises several surface elements and has been adapted to the training object. In step 203 a modified training surface model is determined by the training unit 14 by modifying surface elements of the adapted training surface model. In particular, surface elements of the adapted training surface model are displaced and/or tilted randomly or by known amounts, in order to determine the modified training surface model. In step 204 subvolumes of the training image are determined by the training unit 14 for the surface elements of the modified training surface model, wherein for a respective surface element a subvolume is determined, which overlaps the respective surface element. In particular, for each modified surface element an elongated subvolume is determined, wherein the elongation direction of the respective subvolume is aligned with a normal of the respective surface element and wherein all determined subvolumes have the same shape and the same dimensions. In step 205 actual distances are determined for the surface elements of the modified training surface models, wherein for a respective surface element a respective distance to the unmodified training surface model, which had been adapted to the training object in the training image and which had been provided by the training data providing unit 13 in step 202, are determined. This determination can be carried out by considering the positions and orientations of the unmodified surface elements of the unmodified training surface model provided in step 202 and the positions and orientations of the respective modified surface elements of the modified training surface model. However, this determination of the actual distances can also just be using the displacements and/or tilts of the surface elements, if they have been displaced and/or tilted in known amounts in step 203. In step 206 the provided convolutional neural network is trained based on the determined subvolumes and the determined actual distances.

In step 207 it is checked whether an abort criterion is fulfilled. For instance, it is checked whether the convolutional neural network had been trained by a desired number of modified training surface models. If this criterion is fulfilled, the method ends in step 208. Otherwise, the method continues with step 203, wherein a further modified training surface model is determined by modifying the surface elements of the adapted training surface model provided in step 202 or by modifying surface elements of an already modified training surface model.

In known model segmentation procedures, which might also be regarded as being boundary detection approaches, in the context of model adaptation the task is normally broken into two steps, a sampling candidate points along a line perpendicular to a mesh element like a triangle and a selection of a most suitable candidate point on the line using a classifier selected via, for instance, Simulated Search disclosed in the above mentioned article by J. Peters et al. Although this two-step approach can yield good segmentation results, it has been found that the reliability and accuracy of boundary detection can be increased if the search step and the classification step are integrated and the distance to the desired boundary of the object in the image is directly estimated from image values, especially gray values, surrounding a mesh triangle using a learning approach, particularly an end-to-end-machine learning approach. This increased reliability and accuracy of boundary detection directly translates into improved reliability and accuracy of model adaptation and hence segmentation of the object in the image. Thus, no sample points are involved any more, but a continuously valued distance can be estimated by the above described segmentation system and method, wherein in an embodiment an oriented subvolume, which is preferentially centered at the respective mesh surface, i.e. at the respective surface element, and which is oriented according to the local coordinate system encoded in the respective mesh, is mapped to a scalar distance value by using the convolutional neural network.

The neural network providing unit is preferentially adapted to provide a neural network which provides a real-valued outcome. Thus, the provided neural network is preferentially not a classification neural network providing a categorical outcome. Correspondingly, the provided neural network preferentially does not comprise a softmax layer as the last layer and is preferentially not trained to output a probability distribution. It can be trained to output continuous values and could be regarded as being adapted for regression, in contrast to being adapted for classification.

The segmentation system and method are therefore adapted to extract image subvolumes on the model surface, wherein, for instance, for each triangle in the case of a triangle mesh an orientation of a subvolume may be derived from a respective coordinate system of the respective triangle. The segmentation system and method can be further adapted to estimate with one or several trained convolutional neural networks the displacement of the respective subvolume center, i.e., for instance, the mesh point where the subvolume is centered, with respect to the desired model surface, i.e. the boundary of the object in the image. The estimated displacement information is subsequently used to adapt the surface model to the object in the image.

The training unit is preferentially adapted to train the one or several convolutional neural networks by using deep learning, particularly deep end-to-end learning, wherein a ground truth segmentation is used for a training image or several ground truth segmentations are used for several training images. Surface parts, i.e. the surface elements, are preferentially displaced and/or tilted, subvolumes are extracted, and preferentially deep learning is used to learn the displacement, i.e. the distances, from the ground truth segmentations.

Although in above described embodiments the surface model is a triangle mesh, in other embodiments the surface model can also be a non-triangle mesh, i.e. a mesh whose surface elements are not triangular.

Image subvolumes, which are preferentially elongated, are extracted preferentially for all surface elements, particularly for all triangles, of the actual surface model, wherein preferentially all subvolumes have the same dimensions and the same shape and wherein the coordinate system of the subvolumes is preferentially defined via the respective coordinate systems of the respective triangles. In particular, the axis of elongation of a respective image subvolume is parallel to a respective triangle normal. Preferentially all subvolumes are collected in a multi-dimensional array and a fully convolutional neural network is used to estimate the displacement of each image subvolume, i.e. of each surface element, with respect to the desired boundary of the object in the image.

The training system and method can be adapted to, for instance, displace and/or tilt the surface elements by known amounts for generating the modified training surface models or they can be randomly displaced and/or tilted during each training iteration, wherein the training of the convolutional neural network preferentially relates to an updating of the weights of the convolutional neural network on the basis of the simulated displacements and/or tilts using back propagation.

Preferentially, the average root mean square distance between the simulated and the predicted displacements is used as training criterion, i.e. the convolutional neural network is trained such that this average root mean square distance or another measure for a deviation between the output of the convolutional neural network, i.e. the simulated or estimated distances, and the displacements, i.e. the actual distances, is minimized.

As explained above, the training system and hence also the training method may be adapted to, instead of training one global convolutional neural network that is used for all surface elements, particularly triangles, of the surface model, train separate convolutional neural networks to more specifically characterize different parts of the object and its appearance in the image. The object is preferentially an anatomical object and the image is preferentially a medical image. For instance, in the field of radiation therapy planning bladder and bones may have fundamentally different appearances like it is the case in MR or computed tomography (CT) images and might benefit from using two different neural networks for boundary detection. The number of separate neural networks and their associations with particular mesh triangles, i.e. with particular surface elements, can be either predetermined, i.e., for instance, different networks for different organs or organ structures, or learned during training. In particular, a subset of triangles associated with a high boundary detection error after initial training may be selected and used to train a second neural network in order to further improve boundary detection for these triangles. Furthermore, from the simulated errors observed during or after training the neural network an extra neural network may be trained to provide confidence scores, i.e. the confidence values, that can be used to increase or decrease the external energy, i.e. the "image force", associated with a detected boundary.

Although in above described embodiments the image comprises image elements, wherein each image element comprises a respective single image value, in other embodiments the respective image element can comprise two or more image values. Thus, for instance, the image may be a multi-protocol or multi-channel image with two or more intensity values associated with each image element. Accordingly, the convolutional neural network may be trained on subvolumes containing an n-tuple of intensity values for each image element being preferentially a voxel. A multi-protocol image is a combination of several images which have been acquired using different protocols, wherein to a respective position within the image the corresponding image values of the several images are assigned. The different protocols can refer to different imaging modalities, i.e., for instance, a first image can be a computed tomography image and a second image can be a magnetic resonance image. The different protocols can also refer to different image acquisition parameters of a same imaging modality for generating different images. The generation of the input array to the network is preferentially similar to the uni-channel or uni-protocol case, i.e. to the case where to each voxel only a single voxel value is assigned. For instance, for each protocol subvolumes can be extracted, i.e. determined, for each triangle. For each subvolume, all voxels of one slice can be serialized into a one-dimensional vector, wherein, in order to collect data from multiple protocols, those one-dimensional vectors can be concatenated to yield one vector that contains all intensity values of all images for a particular triangle, wherein this vector together with the corresponding other vectors of all subvolumes can be used as input for the neural network which then determines the distances. For example, if a mesh with 5000 triangles is used, a subvolume size of 5×5×40, and two input modalities (e.g., T1-weighted and T2-weighted magnetic resonance imaging) are considered, the input to the neural network could be a 5000×40× (5*5*2), i.e. 5000×40×50, array.

Preferentially the subvolumes are sampled on a regular grid. However, in order to reduce the number of samples that need to be processed, the subvolumes may be sampled in rings around the center line, i.e. the line that is perpendicular to the surface element and passes through the center of the surface element, wherein more distant rings are sampled more sparsely. Thus, the subvolumes can be cylindrically shaped.

The provided images can be two-dimensional images, three-dimensional images or four-dimensional images, i.e. they can also depend on the time.

Although in above described embodiments the images are CT images or MR images, they can also be images of another imaging modality like ultrasound images.

Although in above described embodiments all subvolumes of all surface elements are used as input for the neural network for determining the distances and/or for training the network, in other embodiments also a single subvolume can be used as an input for the neural network and the neural network can be trained for providing a single distance for the single subvolume and possibly further parameters for the single subvolume like a normal of the boundary of the object in the image. However, using all subvolumes as input is preferred, because it can lead to better segmentation results. For instance, this may allow the neural network to learn shared weights during training, that is, to enforce for all triangles the same set of weights are learned for predicting the boundary.

The segmentation system and/or the training system may be embodied as, or in, a single device or apparatus, such as a workstation or imaging apparatus or mobile device. The device or apparatus may comprise one or more microprocessors which execute appropriate software. The software may have been downloaded and/or stored in a corresponding memory, e.g., a volatile memory such as RAM or a non-volatile memory such as Flash. Alternatively, the functional units of the system may be implemented in the device or apparatus in the form of programmable logic, e.g., as a Field-Programmable Gate Array (FPGA). In general, each functional unit of the system may be implemented in the form of a circuit. It is noted that each system may also be implemented in a distributed manner, e.g., involving different devices or apparatuses. For example, the distribution may be in accordance with a client-server model, e.g., using a server and a thin-client.

Here and elsewhere, any 'providing unit', such as the image providing unit, the model providing unit, the neural network providing unit or the training data providing unit, may be embodied as an input interface for accessing the respective data. The input interface may take various forms, such as a network interface to a Local Area Network (LAN) or a Wide Area Network (WAN), such as the Internet, a storage interface to an internal or external data storage, e.g., a volatile or non-volatile memory, harddisk, solid state storage, etc. The image providing unit may thus be embodied as an image input interface. The model providing unit may thus be embodied as an model data input interface. The neural network providing unit may thus be embodied as an neural network data input interface. The training data providing unit may thus be embodied as a training data input interface. Two or more of such 'providing units' may be embodied as a single input interface.

Units such as the subvolumes determination unit, the neural network providing unit, the distance determination unit and the model adaptation unit may be implemented by a processor, or a system of processors, which is/are configured by suitable software to perform the described functions. For example, the segmentation system may comprise a processor configured to internally communicate with the input interface(s) and a memory accessible by the processor. The memory may store instructions to cause the processor to perform the functions as described elsewhere in relation to the subvolumes determination unit, the neural network providing unit, the distance determination unit and/or the model adaptation unit.

Likewise, in the training system, units such as the training unit may be implemented by a processor, or a system of processors, which is/are configured by suitable software to perform the described functions. For example, the training system may comprise a processor configured to internally communicate with the input interface(s) and a memory accessible by the processor. The memory may store instructions to cause the processor to perform the functions as described elsewhere in relation to the training unit.

Each method described in this specification may be implemented on a computer as a computer implemented method, as dedicated hardware, or as a combination of both. Instructions for the computer, e.g., executable code, may be stored on a computer readable medium, e.g., in the form of a series of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the provision of the image, the provision of the deformable surface model, the provision of the convolutional neural network, the determination of the subvolumes, the determination of the distances, the adaptation of the model, et cetera performed by one or several units or devices can be performed by any other number of units or devices. These procedures and/or the control of the segmentation system in accordance with the segmentation method and/or the control of the training system in accordance with the training method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a segmentation system for segmenting an object in an image. The segmentation system is configured to place a surface model comprising surface elements within the image, to determine for each surface element a respective subvolume of the image and to use a neural network for determining respective distances between the surface elements and the boundary of the object in the image based on the determined subvolumes. The surface model is then adapted in accordance with the determined distances, in order to segment the object. This segmentation, which is based on the subvolumes of the image and the neural network, is improved in comparison to known techniques which rely, for instance, on a sampling of candidate points along lines being perpendicular to the respective surface element and on a determination of likelihoods for the candidate points that they indicate a boundary of the object.

The invention claimed is:

1. A segmentation system for segmenting an object in an image, the segmentation system comprising:
   an image providing unit for providing an image of an object, the image representing an image volume,
   a model providing unit for providing a deformable surface model for being adapted to a surface of the object, wherein the surface model comprises surface elements defining respective parts of a mesh surface, a subvolumes determination unit for placing the surface model within the image and for determining for each surface element of the surface model a respective subvolume of the image such that the respective subvolume overlaps with the respective surface element, a neural network providing unit for providing a convolutional neural network being adapted to determine (i) distances (d) between surface elements of the surface model and a boundary of the object in the image based on determined subvolumes, and (ii) confidence values for surface elements of the surface model based on the subvolumes, wherein a confidence value for a respective surface element is indicative of an estimation of a deviation of the distance determined for the respective surface element from the actual distance of the respective surface element to the boundary of the object in the image, a confidence value determination unit for determining confidence values for the surface elements of the surface model by using the provided neural network based on the determined subvolumes, a distance determination unit for determining respective distances (d) between the surface elements of the provided and placed surface model and the boundary of the object in the provided image by using the provided neural network based on the determined subvolumes, and a model adaptation unit for adapting the surface model to the object in the image in accordance with the determined distances (d).

2. The segmentation system as defined in claim 1, wherein the model adaptation unit is adapted to adapt the surface model in accordance with the determined distances (d) and based on the respective confidence value determined for the respective surface element.

3. The segmentation system as defined in claim 1, wherein the model providing unit is adapted to provide the surface model such that each surface element comprises a direction aligned with the normal of the respective surface element, wherein the distance determination unit is adapted to determine the respective distance (d) in the direction of the respective surface element.

4. The segmentation system as defined in claim 1, wherein the model providing unit is adapted to provide the surface model such that each surface element comprises a direction aligned with the normal of the respective surface element, wherein the subvolumes determination unit is adapted to determine the subvolumes such that they are elongated in the direction of the respective surface element.

5. The segmentation system as defined in claim 1, wherein the subvolumes determination unit is adapted to determine the subvolumes such that they have the same dimensions and the same shape.

6. The segmentation system as defined in claim 1, wherein the image providing unit is adapted to provide the image such that each image element comprises two or more image values, the two or more image values being obtained from different imaging modalities or from different image acquisition protocols of a same imaging modality.

7. The segmentation system as defined in claim 1, wherein the subvolumes determination unit is adapted to determine cylindrically shaped subvolumes.

8. The segmentation system as defined in claim 1, wherein the subvolumes determination unit is adapted to determine the subvolumes by sampling the image, wherein the image is sampled such that a degree of sampling depends on a distance from a center of the respective subvolume.

9. A training system for training a neural network, the training system comprising:

a neural network providing unit for providing (i) a convolutional neural network and (ii) a further convolutional neural network for determining confidence values for surface elements of a surface model of an object based on the subvolumes, a training data providing unit for providing a training image showing a training object and for providing a deformable training surface model which comprises surface elements defining respective parts of a mesh surface, wherein the surface model has been adapted to the training object, a training unit for training the provided neural network, wherein the training unit is adapted to:

determine several modified training surface models by modifying surface elements of the adapted training surface model, determine subvolumes of the training image for the surface elements of the modified training surface models, wherein for a respective surface element a subvolume is determined, which overlaps the respective surface element, determine actual distances for the surface elements of the modified training surface models, wherein for a respective surface element a respective distance to the un-modified training surface model, which has been adapted to the training object in the training image, is determined, determine simulated distances for the surface elements of the modified training surface models based on the determined corresponding subvolumes and the trained convolutional neural network, determine confidence values for the surface elements of the modified training surface models, wherein for a respective surface element a respective confidence value is determined based on a deviation of the respective simulated distance from the respective actual distance, train the provided convolutional neural network based on the determined subvolumes and the determined actual distances, and train the further convolutional neural network based on the confidence values and the subvolumes of the training image determined for the surface elements of the training surface model.

10. A segmentation method for segmenting an object in an image, the segmentation method comprising:

providing an image of an object by an image providing unit, the image representing an image volume, providing a deformable surface model for being adapted to a surface of the object, wherein the surface model comprises surface elements defining respective parts of a mesh surface, by a model providing unit, placing the surface model within the image and determining for each surface element of the surface model a respective subvolume of the image such that the respective subvolume overlaps with the respective surface element by a subvolumes determination unit, providing, by a neural network providing unit, a convolutional neural network being adapted to determine (i) distances between surface elements of the surface model and a boundary of the object in the image based on determined subvolumes, and (ii) confidence values for surface elements of the surface model based on the subvolumes, wherein a confidence value for a respective surface element is indicative of an estimation of a deviation of the distance determined for the respective surface element from the actual distance of the respective surface element to the boundary of the object in the image, determining confidence values for the surface elements of the surface model by using the provided neural network based on the determined subvolumes, determining respective distances between the surface elements of the provided and placed surface model and the boundary of the object in the provided image by using the provided neural network based on the determined subvolumes by a distance determination unit, and adapting the surface model to the object in the image in accordance with the determined distances (d) by a model adaptation unit.

11. A training method for training a neural network, the training method comprising:

providing (i) a convolutional neural network and (ii) a further convolutional neural network for determining confidence values for surface elements of a surface model of an object based on the subvolumes by a neural network providing unit, providing a training image showing a training object and providing a deformable training surface model which, comprises surface elements defining respective parts of a mesh surface, wherein the surface model has been adapted to the training object, by a training data providing unit, and training the provided neural network by a training unit, wherein the training includes:

determining several modified training surface models by modifying surface elements of the adapted training surface model, determining subvolumes of the training image for the surface elements of the modified training surface models, wherein for a respective surface element a subvolume is determined, which overlaps the respective surface element, determining actual distances for the surface elements of the modified training surface models, wherein for a respective surface element a respective distance to the un-modified training surface model, which has been adapted to the training object in the training image, is determined, determining simulated distances for the surface elements of the modified training surface models based on the determined corresponding subvolumes and the trained convolutional neural network, determining confidence values for the surface elements of the modified training surface models, wherein for a respective surface element a respective confidence value is determined based on a deviation of the respective simulated distance from the respective actual distance, training the provided convolutional neural network based on the determined subvolumes and the determined actual distances, and training the further convolutional neural network based on the confidence values and the subvolumes of the training image determined for the surface elements of the training surface model.

12. A non-transitory computer readable medium storing instructions executable by an electronic data processing device, the non-transitory computer readable medium comprising instructions that, when executed, cause the data processing device to:

provide an image of an object by an image providing unit, the image representing an image volume;

provide a deformable surface model for being adapted to a surface of the object, wherein the surface model comprises surface elements defining respective parts of a mesh surface, by a model providing unit;

place the surface model within the image and determining for each surface element of the surface model a respective subvolume of the image such that the respective subvolume overlaps with the respective surface element by a subvolumes determination unit, provide, by a neural network providing unit, a convolutional neural network being adapted to determine (i) distances between surface elements of the surface model and a boundary of the object in the image based on determined subvolumes and (ii) confidence values for surface elements of the surface model based on the subvolumes, wherein a confidence value for a respective surface element is indicative of an estimation of a deviation of the distance determined for the respective surface element from the actual distance of the respective surface element to the boundary of the object in the image;

determine confidence values for the surface elements of the surface model by using the provided neural network based on the determined subvolumes by a confidence value determination unit;

determine respective distances between the surface elements of the provided and placed surface model and the boundary of the object in the provided image by using the provided neural network based on the determined subvolumes by a distance determination unit; and adapt the surface model to the object in the image in accordance with the determined distances (d) by a model adaptation unit.

13. A non-transitory storage medium storing instructions executable by an electronic data processing device, the non-transitory storage medium comprising instructions for training a convolutional neural network, wherein the training includes:

determining several modified training surface models, wherein the training surface models comprise surface elements defining respective parts of a mesh surface, by modifying surface elements of the adapted training surface model, determining subvolumes of a training image, wherein the training image shows a training object by a training data providing unit and wherein the training surface model has been adapted to the training object, for the surface elements of the modified training surface models, wherein for a respective surface element a subvolume is determined, which overlaps the respective surface element, determining actual distances for the surface elements of the modified training surface models, wherein for a respective surface element a respective distance to the un-modified training surface model, which has been adapted to the training object in the training image, is determined, determining simulated distances for the surface elements of the modified training surface models based on the determined corresponding subvolumes and the trained convolutional neural network, determining confidence values for the surface elements of the modified training surface models, wherein for a respective surface element a respective confidence value is determined based on a deviation of the respective simulated distance from the respective actual distance, training the convolutional neural network based on the determined subvolumes and the determined actual distances, and training the convolutional neural network based on the confidence values and the subvolumes of the training image determined for the surface elements of the training surface model.

* * * * *